United States Patent [19]

Yokota et al.

[11] 4,078,429

[45] Mar. 14, 1978

[54] WOBBLE PLATE FLOW-RATE MEASURING DEVICE

[75] Inventors: Akinori Yokota; Keizaburo Usui, both of Yokohama; Tomiyuki Segawa, Yokosuka, all of Japan

[73] Assignee: Nissan Motor Company, Limited, Japan

[21] Appl. No.: 719,103

[22] Filed: Aug. 31, 1976

[30] Foreign Application Priority Data

Sep. 8, 1975  Japan ................... 50-108734

[51] Int. Cl.² ............................................. G01F 3/06
[52] U.S. Cl. .................................................. 73/252
[58] Field of Search ................ 73/194 B, 252, 253, 73/244

[56] References Cited

U.S. PATENT DOCUMENTS

| 203,812 | 5/1978 | Austin | 73/252 |
| 213,944 | 4/1979 | Sanford | 73/252 |
| 264,979 | 9/1882 | Van Norden | 73/252 |
| 2,453,376 | 11/1948 | Lagasse | 73/194 |

Primary Examiner—Herbert Goldstein
Attorney, Agent, or Firm—Robert E. Burns; Emmanuel J. Lobato; Bruce L. Adams

[57] ABSTRACT

A flow-rate measuring device comprises a cavity and an inlet port for receiving and introducing a flow of fluid to the cavity. A wobble plate is pivotally disposed in the cavity to equally divide it into first and second cavity sections when in equilibrium position. An arcuate baffle plate is disposed in the cavity. First and second discharge channels are formed between the edges of the baffle plate and the inner wall of the cavity. An outlet port is connected to the discharge channels. The rearward end of the wobble plate is in proximity to the arcuate surface of the baffle plate and the pivot point of the wobble plate lies at the center of curvature of the baffle plate. The cavity has an increasing transverse dimension toward the first and second discharge channels to form a converging space toward each discharge channel when the wobble plate takes an extremely inclined position.

2 Claims, 3 Drawing Figures

4,078,429

WOBBLE PLATE FLOW-RATE MEASURING DEVICE

BACKGROUND OF THE INVENTION

The present invention relates to flow measurement, and in particular to a flow-rate measuring device of a wobble plate type particularly suitable for slow-rate flow measurement.

SUMMARY OF THE INVENTION

An object of the present invention is to provide a novel flow-rate measuring device utilizing the wobbling motion of a plate pivotally disposed in the passage of a flow due to pressures generated by the change of direction of the flow by the wobbling plate and a baffle having a curved surface to the adjacent edge of the wobbling plate.

Another object of the invention is to provide a flow-rate measuring device which is compact and easy to manufacture.

A further object of the invention is to provide a flow-rate measuring device which permits measurement of slow flow rate.

In accordance with the present invention, there is provided a flow-rate measuring device which comprises a flow-rate measuring device comprising, an inlet port for receiving a flow of fluid, a cavity connected to the inlet port, an arcuate baffle plate disposed in the cavity to form with the inner wall of the cavity first and second discharge channels extending substantially at right angles to the inlet port, and a wobble plate pivotally disposed in the cavity so that it equally divides the cavity into first and second cavity sections when the wobble plate is in a longitudinally equilibrium position and pivoted at the center of curvature of the baffle plate and in proximity at one end to the arcuate face of the baffle plate, the cavity having an increasing transverse dimension toward the first and second discharge channels, whereby the fluid is directed into the first and second cavity sections alternately to one of the first and second discharge channels to thereby cause the wobble plate to rotate in opposite directions about its pivot at a frequency proportional to the rate of flow of the fluid.

A baffle plate is provided in the cavity. The baffle plate has a curved surface along which one edge of the wobble plate moves when it rotate about its pivot. The cavity has a linearly increasing transverse dimension such that when the wobble plate takes an extremely inclined position a converging space is formed toward a corresponding discharge channel. The fluid introduced into the inlet port hits the wobble plate and is directed thereby into one of the first and second cavity sections depending on to which side the wobble plate is inclined and further directed to the associated discharge channel by the working surface of the baffle plate. The wobble plate is then caused to rotate about the transverse pivot axis by pressures exerted thereupon when the direction of flow is altered by the baffle so that the wobble plate is inclined to the reverse side. The intake flow will then be directed to the opposite cavity sections and a similar process occurs when the flow direction is bent by the baffle plate this time in the opposite direction to thereby allow the wobble plate to return to the original position. This process will be repeated as long as the fluid continues to flow causing the wobble plate to rotate in opposite directions through a limited angle at an interval proportional to the flow rate. The frequency or number of wobbling motions per unit time is a direct measure of flow rate.

BRIEF DESCRIPTION OF THE DRAWINGS

The invention will be further described by way of example in connection with the accompanying drawings, in which.

DESCRIPTION OF THE PREFERRED EMBODIMENT

Figure 1:
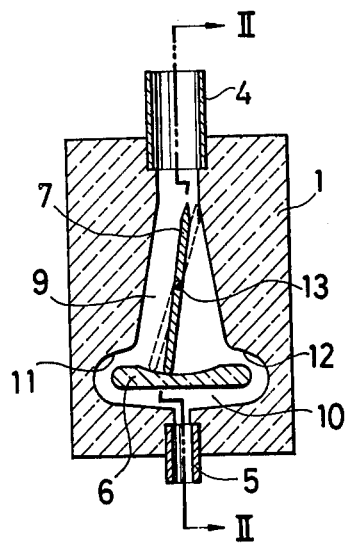
FIG. 1 is a crosssectional view of a flow-rate measuring device according to the invention.
Figure 2:
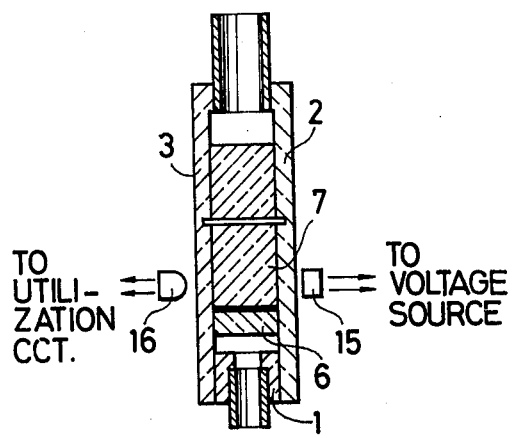
FIG. 2 is a crosssectional view taken along the section lines II—II of FIG. 1.
Figure 3:
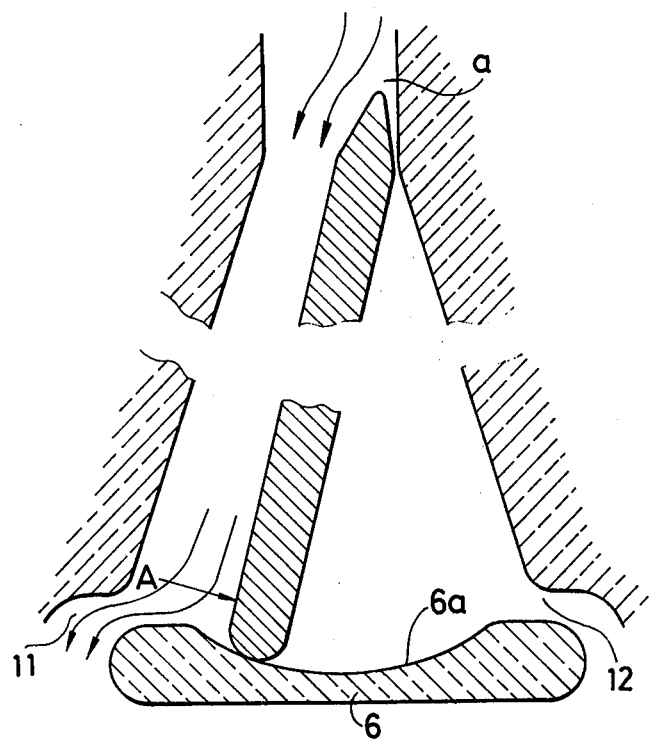
FIG. 3 is a fragmentary enlarged view of the device useful for describing the operation of the invention.

Referring now to FIGS. 1 to 3, a flow rate measuring or sensing device in accordance with the present invention comprises a cavity block 1, transparent side plates 2 and 3 of plastic material, and an inlet port 4, an outlet port 5, a baffle plate 6 and a pivoted wobble plate 7. The block 1 is formed with a hollow space which extends in one direction through block 1 and communicates with the inlet port 4. The cavity is divided into a forward cavity portion 9 and a rearward cavity portion 10 connected by discharge channels 11 and 12 formed between the baffle plate 6 and the inside wall of the cavity 9. Plates 2 and 3 are secured to the opposite sides of the block 1 with the baffle plate 6 therebetween. The baffle plate 6 has an arcuate surface 6a. The rearward edge of the wobble plate 7 is close to and movable along the surface 6a of the baffle plate. The wobble plate is pivotally supported by the side plates 2 and 3 as at 13 which is located at the center of curvature of the surface 6a of plate 6. The discharge channels 11 and 12 are aligned to each other in symmetrical positions relative to the pivot 13, and extend in a direction normal to the direction of flow through the inlet port 4. The forward cavity portion 9 diverges rearwardly to allow the fluid to be discharged through one of the discharge channels 11 and 12. As clearly seen in FIG. 3, the wobble plate 7 has a forwardly tapered end which comes into contact with the inside wall of the portion of the cavity adjacent to the inlet port. The inlet port 4 is adapted to be connected to a source of fluid under pressure or upstream side of a fluidic flow, and the outlet port 5 is adapted to be connected to the downstream side of the flow. When the wobble plate 7 is in the equilibrium position, it equally divides the cavity portion 9 into right and left cavity sections.

Assume that, in operation, the wobble plate 7 takes a position as indicated in FIG. 1, the pressurized fluid introduced into the forward cavity portion 9 will hit the left side of wobble plate 7, follow the path as indicated by the arrows in FIG. 3, and hit the baffle plate 6 which directs the flow at right angles to the discharge channel 11. As the fluid changes its direction, a pressure is exerted on the rearward end of the wobble plate 7 as indicated by arrow A to rotate it about pivot 13 in a counterclockwise direction. In addition, a stagnant flow will be produced in an area $a$ defined by one of the tapered surfaces of wobble plate 7 and the adjacent wall of the slot 9. This stagnation produces a higher pressure than on the opposite side of the tapered surfaces and tends to rotate the wobble plate 7 in a counterclockwise direction.

Due to inertia the wobble plate 7 continues to rotate in the same direction and moves past a point where it bisects the cavity 9. Immediately after it passes the bisecting plane, a portion of the fluid will be directed into the right half portion of the cavity 9 and exert a pressure on the forward end of the wobble plate 7 to rotate it further in the same direction until it reaches a point where the fluid produces a pressure on the rearward end of the wobble plate to rotate it in clockwise direction. Stagnation of flow occurs this time to the left of the wobble plate 7 to aid in rotating the wobble plate 7, in the same direction of rotation.

The inner wall of the cavity portion 9 forms a rearwardly converging space with the wobble plate 7 when it takes an extremely inclined position as indicated by dotted lines in FIG. 1, so that the fluid will tend to squeeze through the narrowed space of the cavity into the discharge channel 11. This produces a greater pressure to the wobble plate 7 to rotate about its pivot than in the case where the inner wall of the cavity portion 9 is otherwise shaped.

This process will repeat as long as the fluid continues to flow, and as a result plate 7 wobbles about its transverse axis at a frequency proportional to the flow rate.

The flow measuring device constructed in accordance with the invention is particularly suitable for measuring a comparatively small flow rate because of the various pressure producing effects.

To measure the wobble frequency, the flow meter of the invention is provided with a light-emitting diode 15 disposed adjacent the side panel 2 and a phototransistor 16 in opposed relation to the LED 15 to receive the transmitted light. The output signal from phototransistor 16 is a pulsating voltage which is coupled to a utilization circuit (not shown) which translates the sensed frequency signal to an analog or digital quantity.

The foregoing description shows only a preferred embodiment of the present invention. Various modifications are apparent to those skilled in the art without departing from the scope of the present invention which is only limited by the appended claims. Therefore, the embodiment shown and described are only illustrative, not restrictive.

What is claimed is:

1. A flow-rate measuring device comprising, a casing provided with a chamber, an inlet channel and an outlet channel communicating with said chamber, a baffle plate having an arcuate concave side surface and disposed dividing the chamber into a forward chamber portion in communication with the inlet channel and a rearward chamber portion in communication with the outlet channel, said forward and rearward chamber portions being connected by first and second connecting channels formed at opposite ends of said baffle plate, a pivot shaft, a wobble plate rockable under control of a fluid flow through said inlet channel into said chamber and out of said chamber through said outlet channel, said wobble plate being pivotally mounted in said forward chamber portion and disposed rockable alternately between two extreme positions about said shaft disposed transversely thereof at a frequency which is a function of the rate of flow of said fluid flow to control flow alternately through said first and second connecting channels, said fluid flow impinging on a forward end of said wobble plate alternately on opposite sides of said forward end to apply pressure thereto and press and hold the forward end alternately at said extreme positions against opposite side surfaces of said inlet channel and flow alternately along same opposite sides of said wobble plate on which impingement takes place as said fluid flow flows from said inlet channel and out of said outlet channel, said fluid flow coacting with said forward end by impingement thereon to alter direction of flow alternately to said first and second connecting channels along said opposite sides of the wobble plate, said baffle opposite ends being disposed for altering the direction of flow of said fluid flow as its exists from said forward chamber alternately into said first and second connecting channels and in directions effective to alternately apply fluid pressure to opposite sides of said rearward end on the same side at which the fluid flow exits from said forward chamber, whereby said wobble plate is rocked alternately between said extreme positions at a frequency which is a function of the rate of flow of said fluid flow, said transverse shaft being located in a position which substantially divides the wobble plate into equal working sections, the center of curvature of said baffle plate being substantially located at a plane passing longitudinally through said transverse shaft so that a rearward end of the wobble plate closely follows the curvature of said baffle plate as the wobble plate rocks about said transverse shaft, and said forward chamber portion having a linearly increasing transverse dimension toward the rearward chamber portion.

2. A flow-rate measuring device according to claim 1, in which said rearward end of the wobble plate is convex and follows along said arcuate concave side surface of said baffle plate.

* * * * *